2,802,893
METHOD OF MAKING HIGH GRADE RUBBER

Arthur I. Rand, Danvers, Mass., and Glenn A. Kidder, Peoria, Ill., assignors to The Firestone Tire & Rubber Company, Akron, Ohio, a corporation of Ohio No Drawing. Application October 2, 1953,
Serial No. 383,936

8 Claims. (Cl. 260—819)

This invention relates to the production of high grade rubber from rubber latex. The invention has particular merit in producing a high grade rubber from an essentially rubber-poor skim obtained as a by-product of methods of concentrating natural rubber latex involving separation of such latex into a rubber-rich cream or concentrate and a rubber-poor skim.

Concentrated natural rubber latices have in recent years assumed an ever increasing role of importance in the rubber markets of the world. This role of importance has resulted for the most part from the ever increasing demand for rubber articles, produced at a considerable distance from rubber plantations directly from latex, e. g., foam rubber articles, adhesives, extruded rubber thread, articles produced by dipping, impregnating and coating in or by latex and the like. Concentrated latices are ideally adapted for the production of such articles not only because of economy in shipping, handling and storing, but also because such articles, when produced from concentrated latices, are of a higher quality than similar articles produced from normal latex.

A large proportion of the presently concentrated latices are produced by methods involving layer separation of a feed latex into a cream and a skim, for example, by centrifuging, creaming, electrodecanting, and the like. The concentrates produced by these methods ordinarily have solids contents of the order of about 60% or higher. The solids contents of these concentrates are essentially all rubber hydrocarbon and include very little of the non-rubber ingredients of the original latex. It has not yet been economically practical, however, to produce by these methods latex concentrates which contain all of the rubber content of a latex. Appreciable quantities (often as high as 12%) of the rubber content of the original latex remain in the skim portion. In addition to rubber, the skim portion also contains a major portion of the non-rubber ingredients of the original latex.

Many attempts have been made to utilize the rubber contained in skim latices but none of these attempts have been particularly satisfactory, due, apparently, to the large proportions of non-rubber materials contained in the resulting rubber. It has been proposed to recover the rubber from a latex skim by the use of conventional rubber coagulants, for example acids, metallic salts, alcohol and the like; but the rubber obtained by this method has been of an inferior quality in being undesirably fast-curing, in having an undesirable odor and color, and in having physical properties so different from the physical properties of high grade commercial rubber that use of skim rubber in the conventional rubber compounds is very difficult.

An object, therefore, of the invention is to provide a high grade solid rubber from the skim portion resulting from concentration of a natural rubber latex.

Another object is to provide an improved method of treating the skim portion of natural rubber latex.

Still another object is to provide a method of treating the skim portion resulting from concentrating a natural rubber latex by means involving separation of the latex into a rubber-rich concentrate and a rubber-poor skim, whereby high grade solid rubber containing relatively little non-rubber ingredients is produced.

Another object is to produce a rubber from the skim portion of natural rubber latex, which rubber will have physical properties comparable to the physical properties of high grade natural rubber.

The above and further objects are conveniently obtained in accordance with the invention by allowing the skim latex resulting from centrifugal concentration of a natural rubber latex to coagulate spontaneously (as in an open vat or tank), reducing the resulting coagulum to a wet crumb or lacy crepe by milling, treating the crumb or crepe rubber with an aqueous solution of an alkali metal hydroxide or ammonium hydroxide and thereafter washing and drying the treated rubber. Although it has been suggested that the coagulum be milled, any other equivalent physical means is suitable which reduces the coagulum to a finely divided state such that a large surface area is presented for association with the alkali metal hydroxide, e. g. pelletizing, grinding as in a hammer mill or the like. While sodium hydroxide represents the preferred hydroxide, the other alkali metal hydroxides and ammonium hydroxide also are suitable for the practice of the invention. The concentration of alkali metal hydroxide or ammonium hydroxide in the aqueous solution may suitably vary over a range of about 0.1% to about 10%; a preferred range of concentration is about 1.0% to 4.0%.

A more thorough understanding of the invention may be had by referring to the following examples.

Example 1

Analyses of typical high grade commercial rubbers are as follows:

|  | Acetone extract, percent | Water extract, percent | Protein, percent [1] | Rubber hydrocarbon, percent |
|---|---|---|---|---|
| Grade A Crepe | 2.69 | 0.35 | 2.75 | 93.0 |
| No. 1 Ribbed Smoked Sheet | 3.53 | 0.53 | 3.00 | 92.7 |

[1] Protein is here and hereafter reported as nitrogen content multiplied by the factor 6.25. Nitrogen content was determined by the Kjeldahl method.

To give an indication of the physical properties of the above rubbers when compounded and cured, test samples of each of the above two high grade commercial rubbers were mixed in the following test formula:

|  | Parts by weight |
|---|---|
| Test rubber | 100 |
| Zinc oxide | 6 |
| Stearic acid | 0.5 |
| Sulfur | 3.5 |
| Captax (mercaptobenzothiazole) | 0.5 |

When these test samples were cured for 30 min. at 260° F., they exhibited the following physical properties:

|  | Grade A Crepe | No. 1 Ribbed Smoked Sheet |
|---|---|---|
| Modulus at 400% elongation, p. s. i. | 350 | 300 |
| Tensile, p. s. i. | 2,800 | 3,750 |

Skim latex resulting from the centrifugal concentration of latex was allowed without further treatment to stand in an open vat until coagulation of the skim latex occurred spontaneously. The resulting coagulum was then milled, first through rough and then through smooth creping rolls, to produce a wet crumb rubber. The wet crumb rubber was divided into two portions. One of the two portions (hereafter designated as portion A) of rubber was dried and baled in a conventional manner. The other portion (hereafter designated portion B) of rubber was placed in a tank containing a 2.75% aqueous solution of sodium hydroxide and allowed to soak for 20 hours. Portion B was then removed from the caustic solution, thoroughly washed, dried and baled.

Analyses of samples from the above two rubber portions were made and the following results obtained:

|  | Acetone extract, percent | Water extract, percent | Protein, percent | Rubber hydrocarbon, percent |
|---|---|---|---|---|
| Portion A | 5.84 | 2.34 | 12.35 | 78.50 |
| Portion B | 4.07 | 0.63 | 1.50 | 93.50 |

It is seen that the analysis of portion B, produced in accordance with the invention, was quite similar to analyses commonly obtained with commercial high grade rubbers. Portion A, produced according to prior art methods, on the other hand has the usual low rubber content and large amount of protein matter common to rubbers produced from skim latex.

The physical properties of the rubbers of portion A and portion B were determined by mixing a sample of each of these portions in the test formula used in determining the physical properties of the commercial high grade rubbers above. Here too, the test samples were cured for 30 min. at 260° F. The physical properties under these conditions were as follows:

|  | Portion A | Portion B |
|---|---|---|
| Modulus at 400% elongation, p. s. i. | 600 | 300 |
| Tensile, p. s. i. | 4,850 | 3,430 |

From the above, it is apparent that the physical properties of portion B, in accordance with the invention, approximate the physical properties of a high grade commercial rubber. On the other hand, both the modulus and tensile of portion A, not in accordance with the invention, were considerably higher than the physical properties common to typical high grade commercial rubbers. As a result, as previously pointed out, great difficulty attends blending a rubber such as that of portion A with high grade commercial rubbers. This difficulty is not experienced with a skim rubber produced in accordance with the invention such as the rubber of portion B.

*Example 2*

As an additional illustration of the practice of this invention, another batch of skim latex resulting from the centrifugal concentration of latex was allowed to stand in an open vat until the latex had undergone spontaneous coagulation. The coagulum was then removed from the vat and milled, first through rough and then through smooth creping rolls, to produce a wet crumb. One portion of the resulting crumb (portion C) was treated in accordance with the invention by heating it at 122° F. for about 4 hours in a 2% aqueous solution of sodium hydroxide. Portion C was allowed to stand over night in this solution and was then removed from the solution, thoroughly washed with water and dried. Another portion of the milled crumb (portion D) was not treated with sodium hydroxide and was used as a control. Samples of portions C and D were mixed in the previously referred to test formula, were cured at 280° F. for the below indicated periods and exhibited the following physical properties:

| | Physical Properties at Indicated Cures | | | | | |
|---|---|---|---|---|---|---|
| | 25 min. | 40 min. | 60 min. | 75 min. | 90 min. | 120 min. |
| Modulus at 600% elongation, p.s.i.: | | | | | | |
| Portion C | 1,100 | 1,300 | 1,400 | 1,475 | 1,500 | 1,400 |
| Portion D | 2,250 | 2,375 | 2,250 | 2,250 | 2,200 | 2,000 |
| Tensile, p. s. i.: | | | | | | |
| Portion C | 3,450 | 3,650 | 3,700 | 3,725 | 3,775 | 3,575 |
| Portion D | 4,200 | 4,175 | 4,175 | 3,900 | 3,875 | 3,650 |

Referring to the above data, it is apparent that portion D, not in accordance with the invention, cured much faster than portion C, in accordance with the invention. Portion C could be easily blended with other high grade rubbers. Portion D, on the other hand, could be so blended only in very small proportions and even then with great difficulty.

Another batch of skim latex was allowed to coagulate spontaneously by standing in an open vat. The coagulum was removed from the vat and milled, washed and dried in the same general manner previously outlined. One portion of the coagulum was not subjected to further treatment and was maintained as a control. Several other portions of the coagulum were treated in accordance with the invention by soaking for 20 hours in aqueous sodium hydroxide solutions of varying sodium hydroxide concentrations indicated in the table which follows. Both the treated and untreated portions of the coagulum were washed and dried. Analyses of these samples were as follows:

| Example No. | Concentrations of sodium hydroxide in solution, percent | Protien, percent | Acetone extract, percent | Ash, percent |
|---|---|---|---|---|
| Control | | 8.9 | 6.54 | 0.26 |
| 3 | 1 | 3.9 | 5.07 | 0.42 |
| 4 | 1½ | 2.7 | 4.77 | 0.50 |
| 5 | 2 | 1.7 | 4.64 | 0.52 |
| 6 | 2½ | 1.5 | 4.49 | 0.52 |
| 7 | 3 | 1.3 | 4.57 | 0.57 |
| 8 | 3½ | 1.3 | 4.63 | 0.46 |
| 9 | 4 | 1.2 | 3.84 | 0.47 |

Referring to the above data, it is seen that in each instance treatment in accordance with the invention produced high grade rubber containing very little of the undesirable non-rubber ingredients contained in prior art skim rubber. Desirable results in accordance with the invention are obtained by use of aqueous alkali metal hydroxide solutions having concentrations either greater or less than the concentrations shown in the illustrative examples.

In certain instances the aging properties of the solid rubber obtained by caustic treating of spontaneously coagulated skim latex in accordance with the invention is improved if certain additional conditions are observed in preparation of the rubber. For example, it is sometimes desirable to clarify the skim latex at some time prior to the spontaneous coagulation thereof but considerably after the original preparation of the skim latex. Skim latex ordinarily takes about 4 days before it begins to coagulate spontaneously. Therefore, if the skim latex is to be clarified, it normally should be clarified before the fourth day of standing. Clarification may be effected by any suitable method, e. g., centrifugal clarification or filtering.

Additional improvement in the aging properties of rubber produced in accordance with the invention is obtained if the wet coagulum, prior to treating with an alkali metal or ammonium hydroxide, is treated with an aqueous solution of an alkaline earth metal hydroxide. Such a hydroxide solution is conveniently prepared by forming a saturated aqueous solution of calcium oxide, barium oxide, strontium oxide, or the like. Although calcium hydroxide is preferred, the other alkaline earth metal hydroxides are also suitable.

It is sometimes desirable, after treating the solid skim rubber with an alkali metal or ammonium hydroxide in accordance with the invention, to incorporate an antioxidant into the treated rubber. Any of the conventional rubber antioxidants are suitable, e. g., secondary aromatic amines such as phenyl-beta-naphthylamine, 2,2,-4,6-tetrasubstituted dihydroquinolines, substituted acridanes and the like, alkylphenyl-aldehyde condensation products, alkylphenol sulfides and other well known antioxidants.

It should be borne in mind that the above specific examples are only illustrative of the invention and are not intended to limit same. Many variations in proportions of ingredients and in conditions are possible without departing from the scope of the invention.

What is claimed:

1. A method of producing high grade rubber from the skim portion resulting from concentrating a natural rubber latex by separating said latex into a rubber-rich cream portion and a rubber-poor skim portion, which comprises the steps of allowing said skim portion to spontaneously coagulate, milling the resulting coagulum to produce a wet crumb rubber, soaking said wet crumb rubber with an aqueous solution of a compound selected from the group consisting of ammonium and alkali metal hydroxides, the concentration of said compound in said solution being in the range of about 0.1% to about 10%, and thereafter washing and drying the treated rubber crumb.

2. A method of producing high grade rubber from the skim portion resulting from concentrating a natural rubber latex by separating said latex into a rubber-rich cream portion and a rubber-poor skim portion, which comprises the steps of allowing said skim portion to spontaneously coagulate, milling the resulting coagulum to produce a wet crumb rubber, soaking said crumb rubber with an aqueous sodium hydroxide solution, the concentration of hydroxide in said solution being in the range of about 0.1% to about 10%, and thereafter washing and drying the treated rubber crumb.

3. A method of producing high grade rubber from the skim portion resulting from concentrating a natural rubber latex by separating said latex into a rubber-rich cream portion and a rubber-poor skim portion, which comprises the steps of allowing said skim portion to spontaneously coagulate, milling the resulting coagulum to produce a wet crumb rubber, soaking said crumb rubber with an aqueous potassium hydroxide solution, the concentration of hydroxide in said solution being in the range of about 0.1% to about 10%, and thereafter washing and drying the treated rubber crumb.

4. A method of producing high grade rubber from the skim portion resulting from concentrating a natural rubber latex by separating said latex into a rubber-rich cream portion and a rubber-poor skim portion, which comprises the steps of allowing said skim portion to spontaneously coagulate, milling the resulting coagulum to produce a wet crumb rubber, soaking said crumb rubber with an aqueous ammonium hydroxide solution, the concentration of hydroxide in said solution being in the range of about 0.1% to about 10%, and thereafter washing and drying the treated rubber crumb.

5. A method of producing high grade rubber from the skim portion resulting from centrifugal concentration of a natural rubber latex which comprises the steps of allowing said skim portion to spontaneously coagulate, milling the resulting coagulum to produce a wet crumb rubber, soaking said crumb rubber with an aqueous solution of a compound selected from the group consisting of ammonium and alkali metal hydroxides, the concentration of said compound in said solution being in the range of about 0.1% to about 10%, and thereafter washing and drying the treated crumb rubber.

6. A method of producing high grade rubber from the skim portion resulting from centrifugal concentration of a natural rubber latex which comprises allowing said skim portion to spontaneously coagulate, soaking the resulting coagulum with an alkaline earth metal hydroxide and a compound selected from the group consisting of ammonium and alkali metal hydroxides, the concentration of said compound in said solution being in the range of about 0.1% to about 10%, and thereafter washing and drying the thus treated coagulum.

7. A method of producing high grade rubber from the skim portion resulting from centrifugal concentration of a natural rubber latex which comprises centrifugally clarifying said skim portion shortly prior to spontaneous coagulation, allowing the clarified skim portion to spontaneously coagulate, milling the resulting coagulum to produce a wet crumb rubber, soaking said crumb rubber with aqueous calcium hydroxide and aqueous sodium hydroxide, the concentration of sodium hydroxide being in the range of about 0.1% to about 10%, and thereafter washing and drying the treated crumb rubber.

8. A method of producing high grade rubber from the skim portion resulting from concentrating a natural rubber latex by separating said latex into a rubber-rich cream portion and a rubber-poor skim portion, which comprises the steps of allowing said skim portion to spontaneously coagulate, reducing the resulting coagulum to a finely divided state, soaking the finely divided coagulum with an aqueous solution of a compound selected from the group consisting of ammonium and alkali metal hydroxides, the concentration of said compound in said solution being in the range of about 0.1% to about 10%, and thereafter washing and drying the treated rubber.

References Cited in the file of this patent

UNITED STATES PATENTS

| 2,263,993 | Kemp et al. | Nov. 25, 1941 |
| 2,347,576 | Ogilby | Apr. 25, 1944 |
| 2,499,588 | Kemp | Mar. 7, 1950 |

OTHER REFERENCES

A. P. C. application of van Gils, Serial No. 327,519, published April 20, 1943.

Rubber, Physical and Chem. Properties 1935, page 8 published by Research Assn. of British Rubber Manufactures.

U. S. DEPARTMENT OF COMMERCE
PATENT OFFICE

CERTIFICATE OF CORRECTION

Patent No. 2,802,893    Arthur I. Rand et al.    August 13, 1957

It is hereby certified that error appears in the printed specification of the above numbered patent requiring correction and that the said Letters Patent should read as corrected below.

Column 5, line 13, for "alkylphenyl-aldehyde" read —alkylphenol-aldehyde-

Signed and sealed this 1st day of July 1958.

(SEAL)
Attest:
KARL H. AXLINE
Attesting Officer

ROBERT C. WATSON
Commissioner of Patents